(12) United States Patent
Ravichandran et al.

(10) Patent No.: US 7,679,340 B2
(45) Date of Patent: Mar. 16, 2010

(54) LOW POWER OPTIMIZED VOLTAGE REGULATOR

(75) Inventors: Krishnan Ravichandran, Saratoga, CA (US); Raviprakash Nagaraj, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 11/823,973

(22) Filed: Jun. 29, 2007

(65) Prior Publication Data

US 2009/0001947 A1    Jan. 1, 2009

(51) Int. Cl.
*G05F 3/16* (2006.01)
(52) U.S. Cl. ......................................... 323/224
(58) Field of Classification Search ............... 323/282, 323/224
See application file for complete search history.

(56) References Cited

U.S. PATENT DOCUMENTS

| | | | |
|---|---|---|---|
| 6,693,412 B2 * | 2/2004 | Ruan et al. | 323/282 |
| 6,724,174 B1 * | 4/2004 | Esteves et al. | 323/224 |
| 6,784,647 B2 * | 8/2004 | Nguyen et al. | 323/282 |
| 7,145,316 B1 * | 12/2006 | Galinski, III | 323/288 |
| 7,208,921 B2 * | 4/2007 | Walters | 323/222 |
| 7,307,406 B2 * | 12/2007 | Shirai et al. | 323/285 |

\* cited by examiner

*Primary Examiner*—Shawn Riley
(74) *Attorney, Agent, or Firm*—Caven & Aghevli LLC

(57) ABSTRACT

Methods and apparatus relating to low power optimized voltage regulators are described. In one embodiment, a voltage regulator controller may cause leakage current from a load to drain a capacitor (e.g., coupled in parallel with the load) during a reduced power state.

14 Claims, 3 Drawing Sheets

LOW POWER OPTIMIZED VOLTAGE REGULATOR

BACKGROUND

The present disclosure generally relates to the field of electronics. More particularly, an embodiment of the invention relates to low power optimized voltage regulator.

Portable computing devices are quickly gaining popularity in part due to their size. Since most portable computing devices rely on batteries to operate, efficient use of battery power can become a critical issue. For example, inefficient use of power in a portable computing device may shorten the period during which the device may of use to a user. Also, inefficient power usage may result in heat generation which may, in turn, damage the electronic components of the computing device.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some of the embodiments discussed herein may enable low power optimized voltage regulators. In particular, with increased emphasis on lowering power consumption of electronic components in portable and handheld systems, more and more scrutiny is being applied to power consumed by subsystems which are inactive but powered. In those situations, the subsystems may continue to draw a small amount of power due to leakage (e.g., sub-threshold and gate leakages) even when a transistor is off. To address this and/or other problems, in one embodiment, available leakage current from a load may be used to drain a bulk capacitor of a voltage regulator, e.g., without wasting energy from a battery to actively drain the charge from the bulk capacitor. Also, the voltage regulators discussed herein (such as the voltage regulator system of FIG. 1) may be provided on an integrated circuit (IC) die in one embodiment.

Figure 1:
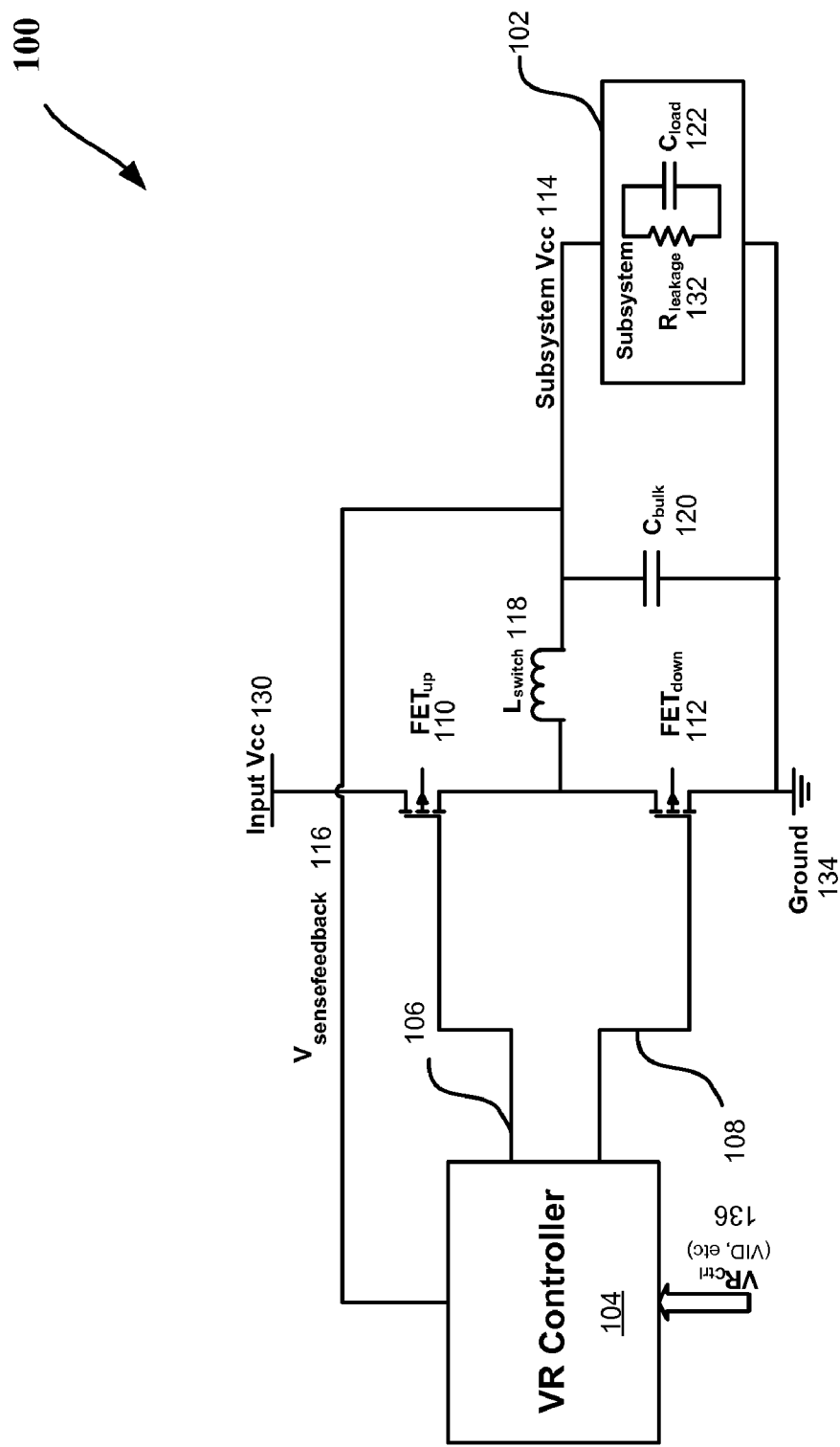
FIG. 1 illustrates a circuit diagram of a voltage regulator system, according to one embodiment.

More particularly, FIG. 1 illustrates a circuit diagram of a voltage regulator system 100, according to one embodiment.

As illustrated in FIG. 1, the voltage regulator system 100 may drive a load labeled subsystem 102. A Voltage Regulator (VR) Controller 104 may generate signals 106 and 108 to turn pull-up transistor 110 (FETup, which may be a field-effect transistor (FET) in one embodiment) and pull-down transistor 112 (FETdown, which may be a field-effect transistor (FET) in one embodiment), respectively, on and off by driving the transistor gates to the appropriate voltages. Subsystem voltage supply (Vcc) 114 may be monitored by the VR Controller 104 via the Vsensefeedback signal 116. A fixed inductor (Lswitch) 118 may be used to control ripple on the subsystem Vcc 114. Additionally, other numbers of FETup and FETdown transistors may be used, e.g., with multiple FETs in parallel (for example for larger loads). Moreover, the number of FETup and FETdown transistors may be the same or different depending on the implementation.

A bulk capacitor (Cbulk) 120 may be used to maintain the subsystem Vcc 114 to within specified tolerance limits. In an embodiment, these tolerance limits may be about 20-50× that of the Load Capacitance (Cload) 122 (other ranges are also possible, such as a broader range of about 5-100 times that of the Cload 122 in one embodiment). For example, if the VR Controller 104 determines that the Subsystem Vcc 114 is below target value, the FETup 110 may be turned on causing current to flow from Input Vcc 130 to the subsystem 102. Alternatively, if the VR Controller 104 determines that the Subsystem Vcc 114 is above target value, the FETup 110 may be turned on causing current to flow from Input Vcc 130 to the subsystem 102. The drawing shows a virtual capacitance (Cload) 122 to indicate the total capacitance that is presented by the Subsystem 102 to the Vcc node 114. This may include the entire gate, interconnect and diffusion capacitance in the load circuit.

Furthermore, the subsystem leakage may be indicated by an equivalent resistor (Rleakage) 132 that draws current from Subsystem Vcc 114 to Ground 134. The leakage may be due to sub-threshold gate leakage or diffusion (e.g., source to drain leakage). Moreover, the VR Controller 104 may receive the target Vcc value and other control parameters through a signal (which may be a bus in one embodiment) indicated by VRctrl 136 in FIG. 1. For example, VID may be Voltage Identification Data indicating the target voltage value. Another example could be signal(s) that indicate the operating condition of the load circuit (e.g., the signal may indicate that the Subsystem 102 is operating at 25% of its peak activity).

In one implementation, when a voltage regulator (such as the system 100) is commanded (e.g., through signal 136) to lower the Subsystem Vcc 114 by 20% (for example, during entry into a lower power state, such as C6 in accordance with one processor architecture), the VR Controller 104 may turn on the pull-down transistor (FETdown) 112 to quickly drain the stored charge in the bulk capacitor (Cbulk) 120 and the Load capacitor (Cload) 122. This can bring the Subsystem Vcc 114 to the target value (e.g., nominal—20%) relatively quickly. Upon exit from this low power state (e.g., exit from C6), the voltage regulator (such as the system 100) may be instructed to restore the normal operating voltage back to subsystem Vcc 114. This may be accomplished by turning on the pull-up transistor (FETup) 110, causing charge current to flow from Input Vcc 130 to the Subsystem Vcc 114.

In one embodiment, the above discussed implementation may cause draining of energy from a battery (which may be coupled to the Input Vcc in an embodiment) each time the load enters and exits the low power state (e.g., C6). This charge may be calculated as follows:

$$Q\text{drained} = (C\text{bulk} + C\text{load}) * 0.2 * \text{Subsystem } Vcc$$

To reduce or limit the energy drainage, an embodiment of the invention may use the naturally occurring leakage in the Subsystem (load) 102 and reduce the drain from the main battery (which may be coupled to the Input Vcc in an embodiment). This embodiment is further discussed herein, e.g., with reference to FIG. 2.

Figure 2:
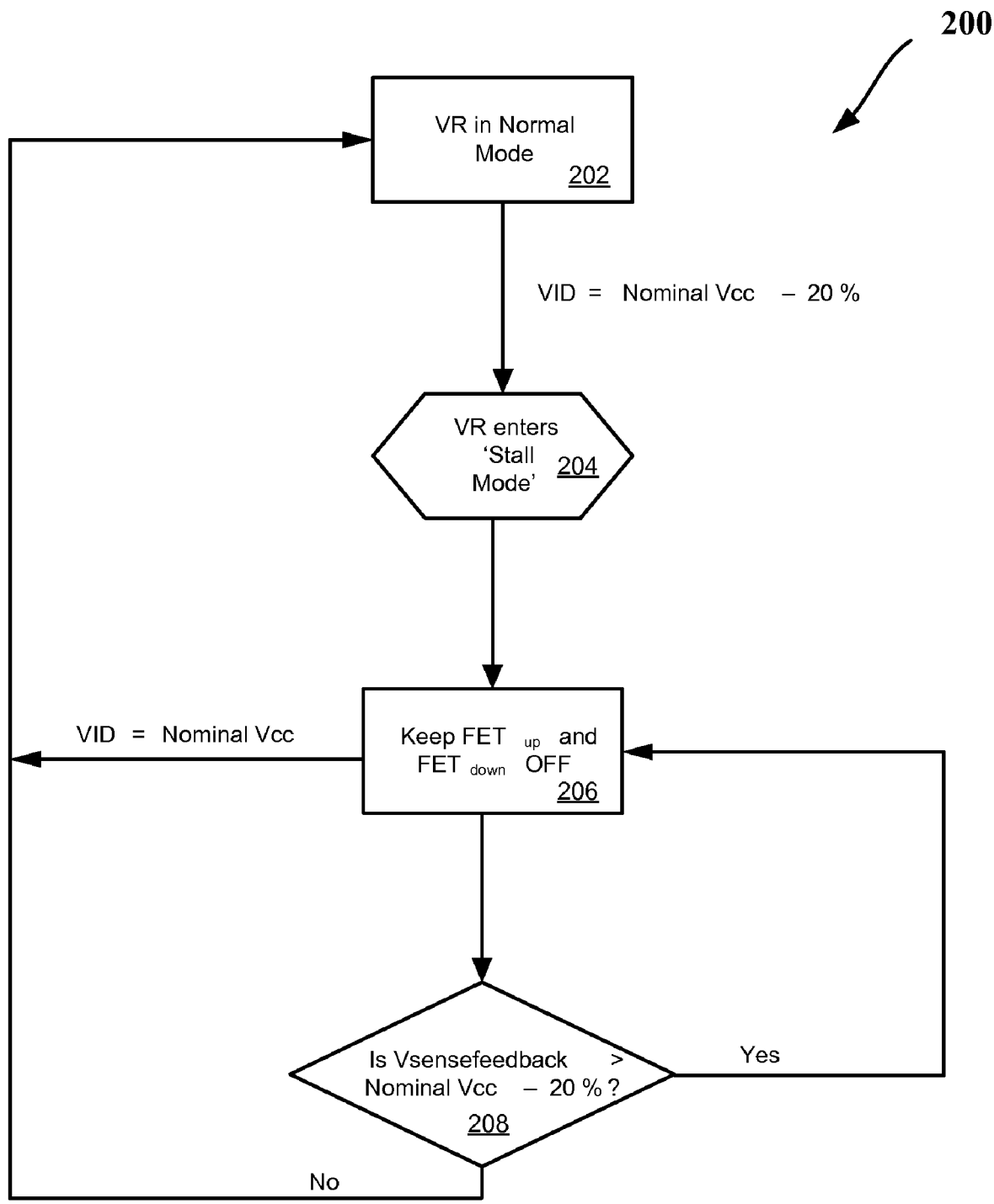
FIG. 2 illustrates a flow diagram of a method according to an embodiment.

More particularly, FIG. 2 illustrates a block diagram of a method 200 to reduce leakage from battery of a computing device, according to one embodiment. In an embodiment, various components discussed with reference to FIG. 3 may include a voltage regulator (such as the system 100 of FIG. 1) that is utilized to perform one or more of the operations discussed with reference to FIG. 2.

Referring to FIGS. 1-2, at an operation 202, a voltage regulator (VR, such as the system 100 of FIG. 1) may be in a normal operating mode (e.g., full power). When VR is instructed to drive to a lower voltage (e.g., Vcc—20%), it may enters a new mode (e.g., "stall mode") at an operation 204. Transition from operation 202 to 204 may occur in response to a change in signal 136, such as discussed with reference to FIG. 1.

At an operation 206 (e.g., after entering the mode of operation 204), the VR may keep both a pull-up FET (e.g., FET 110) and a pull-down FET (e.g., FET 112) off (e.g., via signals 106 and 108). In one embodiment, if at operation 206, the signal 136 reaches nominal Vcc levels (indicating a return to normal operating state), the method 200 will resume at operation 202. At an operation 208, the VR may constantly sense the subsystem Vcc (e.g., sense the level of Vcc 114 via the Vsensefeedback 116) to determine if the voltage has reached the lower end of the target voltage (for example, Vcc—20%). If not (the "yes" branch in FIG. 2, it continues to stay in the "stall mode" of operation 204 by keeping the FETs off (e.g., at operation 206). When the subsystem Vcc 114 reaches the target point (e.g., Vcc—20%), the VR may revert back to normal mode and use both pull-up and pull-down FETs (e.g., FETs 110 and 112) to regulate the voltage supplied to the subsystem (e.g., supplied to load 102 via subsystem Vcc 114). In one embodiment, at any time during the "stall mode" if the VR is instructed to recover back to nominal Vcc (via the VID signal 136), then it switches to normal mode at operation 202. Note that the method 200 illustrated in FIG. 2 may be applied to any target voltage specified including the case when the Subsystem Vcc 114 is requested to be turned OFF (e.g., with Vcc at—100% or 0V).

In an embodiment, the method 200 may allow the subsystem to stay in the low power state (e.g., C6) for short periods of time, then no charge/energy is drained from the Input Vcc (e.g., battery). In accordance with one embodiment, the following analysis may be used to determine the time window for which this may be beneficial:

Charge available for draining by leakage before Subsystem Vcc reaches Nominal—20%:

$$Q\text{avail} = (C\text{bulk} + C\text{load}) * 0.2 * \text{Subsystem } Vcc$$

Charge drained by leakage in time $T = Q = (\text{Subsystem } Vcc/R\text{leakage}) * T$ Since leakage current may vary as the subsystem Vcc drops, an average leakage current based on the average Vcc may be used (e.g., equal to mid-point between Vcc and Vcc—20%) of Vcc—10%.

$$Q\text{leakage} = (\text{Subsystem } Vcc * 0.9/R\text{leakage}) * T$$

For break-even point calculation, $Q\text{avail} = Q\text{leakage}$ $$(C\text{bulk} + C\text{load}) * 0.2 * \text{Subsystem } Vcc = (\text{Subsystem } Vcc * 0.9/R\text{leakage}) * T$$

Therefore, $T = R\text{leakage} * (C\text{bulk} + C\text{load}) * 0.22$

In some embodiments, for a functional block in a chipset the Capacitance (Cbulk+Cload) may be about 100 uF and Rleakage may be about 100 Ohms (e.g., equivalent to 10 mA leakage at 1V), time T may be about 2 ms. For smaller subsystems, the Rleakage may be as large as 1 Kohm, in which case the time T may be in 10 s of ms. If the functional block enters this low power state 100 times a second and spends less than 2 ms each time, then the net energy savings with this method may be about: (Cbulk+Cload)*0.2*Subsystem Vcc*100=100 uF*0.2*1 V*100=2 mJoules/sec=2 mW. If there are several independent Vcc rails in the platform, these savings may be in 10 s of mW. For small hand-held systems, where the total platform power is only a few 100 mW, such savings might be quite substantial.

Figure 3:
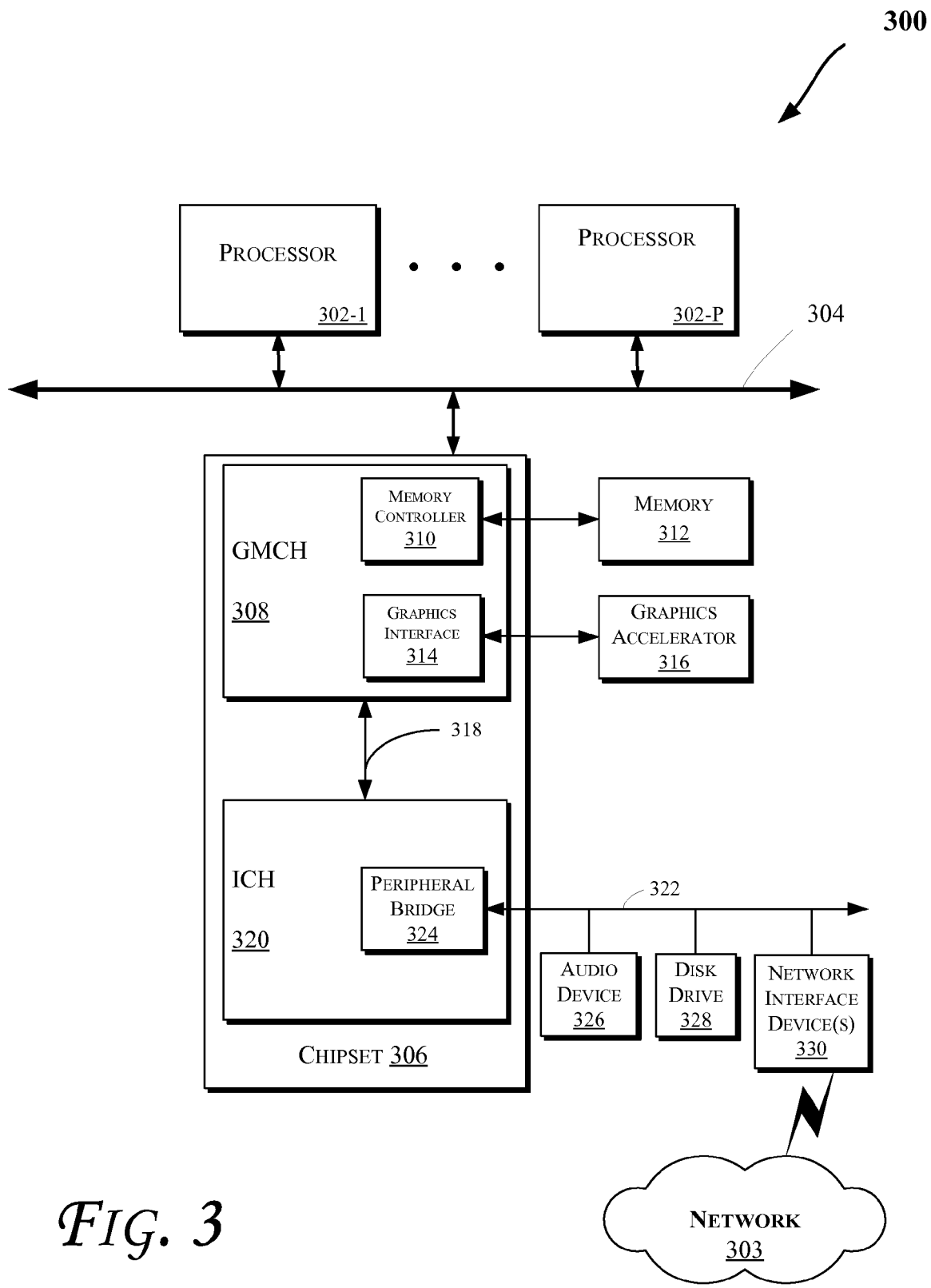
FIG. 3 illustrates a block diagram of an embodiment of a computing system, which may be utilized to implement some embodiments discussed herein.

The techniques discussed herein (e.g., with reference to FIGS. 1-2) may be applied in various computing system components, such as the components discussed with reference to the system of FIG. 3. For example, the circuit of FIG. 1 may be utilized to regulate the voltage provided to the processors 302, chipset 306, etc. discussed with reference to FIG. 3. More particularly, FIG. 3 illustrates a block diagram of a computing system 300 in accordance with an embodiment of the invention. The computing system 300 may include one or more central processing unit(s) (CPUs) or processors 302-1 through 302-P (which may be referred to herein as "processors 302" or "processor 302"). The processors 302 may communicate via an interconnection network (or bus) 304. The processors 302 may include a general purpose processor, a network processor (that processes data communicated over a computer network 303), or other types of a processor (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors. In an embodiment, the operations discussed with reference to FIGS. 1-2 may be performed by one or more components of the system 300.

A chipset 306 may also communicate with the interconnection network 304. The chipset 306 may include a graphics memory control hub (GMCH) 308. The GMCH 308 may include a memory controller 310 that communicates with a memory 312. The memory 312 may store data, including sequences of instructions that are executed by the processor 302, or any other device included in the computing system 300. In one embodiment of the invention, the memory 312 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 304, such as multiple CPUs and/or multiple system memories.

The GMCH 308 may also include a graphics interface 314 that communicates with a graphics accelerator 316. In one embodiment of the invention, the graphics interface 314 may communicate with the graphics accelerator 316 via an accelerated graphics port (AGP). In an embodiment of the invention, a display (such as a flat panel display, a cathode ray tube (CRT), a projection screen, etc.) may communicate with the graphics interface 314 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 318 may allow the GMCH 308 and an input/output control hub (ICH) 320 to communicate. The ICH 320 may provide an interface to I/O devices that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the processor 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and one or more network interface device(s) 330 (which is in communication with the computer network 303). Other devices may communicate via the bus 322. Also, various components (such as the network interface device 330) may communicate with the GMCH 308 in some embodiments of the invention. In addition, the processor 302 and the GMCH 308 may be combined to form a single chip. Furthermore, the graphics accelerator 316 may be included within the GMCH 308 in other embodiments of the invention.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 300 may be arranged in a point-to-point (PtP) configuration. For example, processors, memory, and/or input/output devices may be interconnected by a number of point-to-point interfaces.

In various embodiments of the invention, the operations discussed herein, e.g., with reference to FIGS. 1-3, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIG. 3.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a voltage regulator controller to control a level of a voltage supply coupled to drive a load;
a capacitor coupled to the load in parallel, to maintain the voltage supply level in accordance with a specified tolerance limit,
wherein the voltage regulator controller causes leakage current from the load to drain the capacitor during a reduced power state.

2. The apparatus of claim 1, further comprising a pull-down transistor and a pull-up transistor coupled between the voltage regulator controller and the load to control a flow of the current into the load.

3. The apparatus of claim 2, wherein the voltage regulator controller generates a first signal to control a state of the pull-down transistor and a second signal to control a state of the pull-up transistor.

4. The apparatus of claim 2, wherein at least one or more of the pull-down transistor or the pull-down transistor comprise a field-effect transistor.

5. The apparatus of claim 2, wherein the pull-up transistor is coupled between a battery and the pull-down transistor.

6. The apparatus of claim 2, wherein the pull-down transistor is coupled between ground and the pull-up transistor.

7. The apparatus of claim 1, further comprising an inductor coupled to the load to control ripple on the voltage supply.

8. The apparatus of claim 7, wherein a node of the inductor is directly coupled to the voltage regulator controller to enable the voltage regulator controller to monitor the voltage supply level.

9. The apparatus of claim 1, wherein one or more of the voltage regulator controller and the capacitor, or the load are on a same integrated circuit die.

10. The apparatus of claim 1, wherein the voltage regulator controller is coupled to receive a signal to indicate one or more of: a target for the voltage supply level or other control parameters.

11. A method comprising:
controlling a level of a voltage supply coupled to drive a load in response to a first signal;
sensing the voltage supply level; and
causing leakage current from the load to drain a capacitor, coupled to the load in parallel, during a reduced power state.

12. The method of claim 11, wherein controlling the voltage supply level comprises generating a plurality of signals to control a state of a plurality of transistors.

13. The method of claim 11, further comprising controlling ripple on the voltage supply.

14. The method of claim 11, further comprising decoupling a battery from the load during the reduced power state.

* * * * *